July 29, 1924.
H. C. KITTELSON
AUTOMOBILE TREAD CHAIN
Filed April 9, 1923
1,503,191
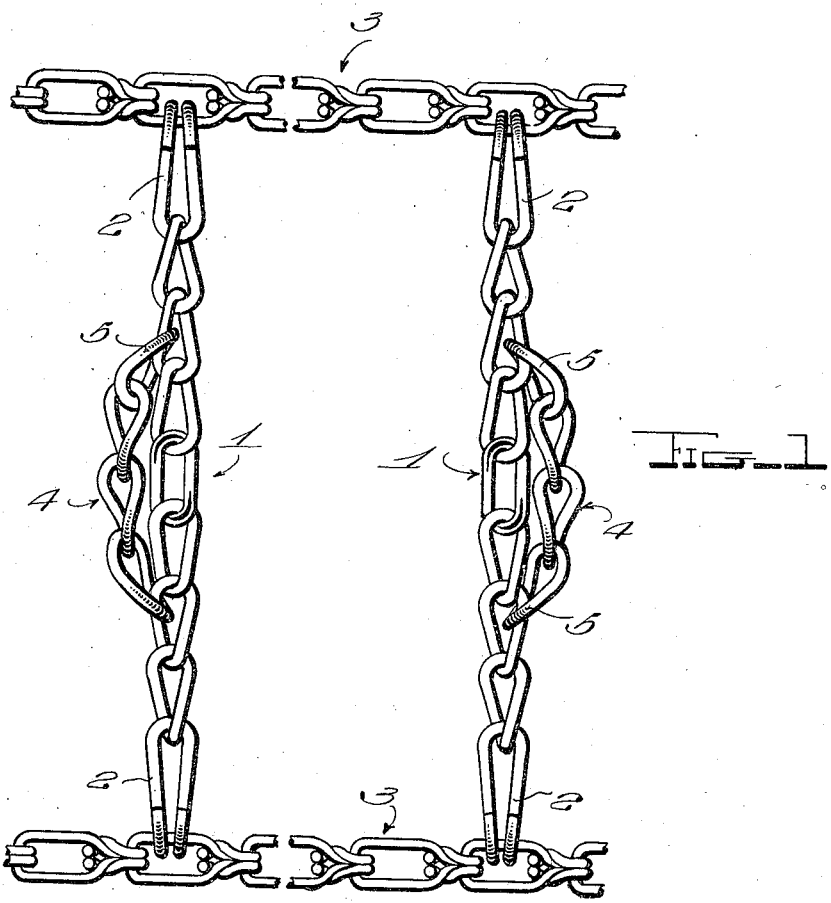
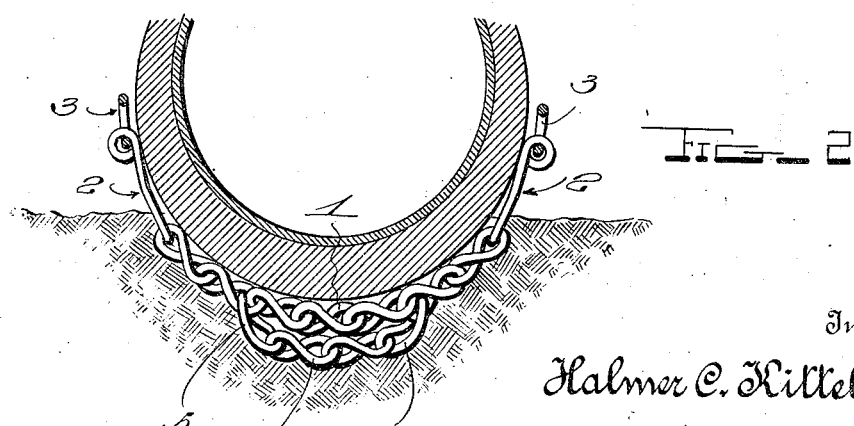
Inventor
Halmer C. Kittelson
By H. B. Wilson & Co.
Attorneys Patented July 29, 1924.

1,503,191

UNITED STATES PATENT OFFICE.

HALMER C. KITTELSON, OF FARGO, NORTH DAKOTA, ASSIGNOR TO STANDARD CHAIN COMPANY, INC., OF THE STATE OF MINNESOTA.

AUTOMOBILE TREAD CHAIN.

Application filed April 9, 1923. Serial No. 630,937.

*To all whom it may concern:*

Be it known that I, HALMER C. KITTELSON, a citizen of the United States, residing at Fargo, in the county of Cass and State of North Dakota, have invented certain new and useful Improvements in Automobile Tread Chains; and I do declare the following to be a full, clear, and exact description of the invention, such as will enable others skilled in the art to which it appertains to make and use the same.

My invention relates to tire chains of the type employing a plurality of cross chains and the object of the invention is to provide an improved traction chain, by perfecting a cross chain which will give extra traction where the ground is soft or slippery or wherever additional traction is required and at the same time will not be injurious to tires or ride any more roughly when traveling on hard roadways, than the ordinary types of cross chains, and also by adding as little as possible to the usual cross chain, in material and weight, providing a device that is simple and inexpensive to manufacture, yet is exceptionally durable and will give more wearing surface and longer life than the usual cross chain.

With the foregoing in view, the invention resides in the novel subject matter hereinafter described and claimed, the description being supplemented by the accompanying drawing.

Figure 1 is a plan view of a tire chain constructed in accordance with my invention.

Figure 2 is a transverse sectional view showing the manner in which the efficiency of the chain is increased when running upon soft earth, snow, or any other surface on which the wheels have a tendency to spin.

In the drawing above briefly described, the numeral 1 designates an ordinary cross chain of an automobile tread chain, said cross chain being formed in the usual manner of twisted links and having hooks 2 on its ends for engagement with a pair of side chains 3, it being understood however that while I have shown my invention in connection with a cross chain for connection to side chains, it is also adaptable to cross chains whose ends are otherwise held, to retain the chain in proper position across a tire.

The numeral 4 designates a relatively short and slack supplemental cross chain disposed alongside the intermediate portion of the main cross chain 1 and having its endmost links 5 directly connected with links of said main chain 1. These end links 5 may be of any desired form, but like the intermediate links of the chain 4 they are preferably twisted and welded to prevent possible separation from adjacent links. When this twisted link formation is provided, one of the end links 5 is twisted oppositely from the other end link to permit the supplemental chain to lie flat upon a hard roadway, by the side of the main chain 1, under ordinary road conditions.

As soon as a traction wheel equipped with the invention, travels upon a soft or slippery surface on which the wheel has a tendency to spin idly, the supplemental, slack cross chain 4 will lap under the main cross chain 1 as shown in Fig. 2 and will consequently approximately double the efficiency of the chain.

When the improved cross linkage consisting of the chains 1 and 4 is used at spaced points and connected with side chains such as those indicated at 3, the adjacent supplemental chains 4 are preferably positioned at opposite sides of their respective main chains 1. By so doing, the chain structure will be equally as efficient for driving reversely, as for forward driving.

As excellent results are obtainable from the details disclosed, they are preferably followed, but within the scope of the invention as claimed, numerous minor changes may be made.

I claim:

1. In a tire chain structure, the combination of a main cross chain to extend across the tread of a tire, and a relatively short and slack supplemental cross chain disposed alongside the intermediate portion of said main chain and having its ends directly connected to links of said main chain in spaced relation to the ends thereof, said supplemental chain being adapted to lap under said main chain and offer double resistance to wheel spinning in soft earth, snow, etc.

2. The structure specified in claim 1 duplicated at spaced points, and side chains to which the ends of the main cross chains are connected, the adjacent supplemental cross chains being positioned at opposite sides of their respective main cross chains.

In testimony whereof I have hereunto affixed my signature.

HALMER C. KITTELSON.